United States Patent [19]

Hart et al.

[11] Patent Number: 5,435,376
[45] Date of Patent: Jul. 25, 1995

[54] FLAME RESISTANT MICROENCAPSULATED PHASE CHANGE MATERIALS

[75] Inventors: Ronald L. Hart; Dale E. Work, both of Dayton, Ohio

[73] Assignee: Microtek Laboratories, Inc., Dayton, Ohio

[21] Appl. No.: 930,982

[22] Filed: Aug. 17, 1992

[51] Int. Cl.⁶ ............................................. F28D 19/00
[52] U.S. Cl. ......................................... 165/10; 165/47
[58] Field of Search .................................. 165/47, 10

[56] References Cited

U.S. PATENT DOCUMENTS

| | | |
|---|---|---|
| 4,053,446 | 10/1977 | Watabe et al. |
| 4,513,053 | 4/1985 | Chen et al. |
| 4,756,958 | 7/1988 | Bryant et al. |
| 4,797,160 | 1/1989 | Salyer ........................ 165/47 |
| 5,007,478 | 4/1991 | Sengupta. |
| 5,053,446 | 10/1991 | Salyer ........................ 165/47 |

*Primary Examiner*—A. Michael Chambers
*Attorney, Agent, or Firm*—Thompson, Hine and Flory

[57] ABSTRACT

A microencapsulated phase change material comprising a microcapsule wall former encapsulating a phase change material as an internal phase, said phase change material being inherently resistant or a flame retardant being admixed with said phase change material.

3 Claims, No Drawings

FLAME RESISTANT MICROENCAPSULATED PHASE CHANGE MATERIALS

BACKGROUND OF THE INVENTION

The present invention relates to microencapsulated phase change materials (PCMs) and, more particularly, to microencapsulated phase change materials which are flame resistant.

U.S. Pat. No. 4,911,232 to Colvin et al. and U.S. Pat. No. 5,007,478 to Sengupta disclose the use of slurries of microencapsulated PCMs in thermal loops for heat transfer in systems which necessitate the use of more efficient thermal transfer fluids, such as systems in which large quantities of heat must be removed in short periods of time or systems in which there are system size restrictions which limit the volume of fluid which can be transported in the thermal loop. Such systems include lasers, electronic components, supercomputers, nuclear generators, etc.

U.S. Pat. No. 4,756,958 to Bryant discloses fibers and fabrics which incorporate microencapsulated PCMs. These materials exhibit enhanced thermal energy storage properties and can be manufactured into garments useful in extreme cold or extreme heat.

U.S. Pat. No. 4,513,053 discloses microencapsulating PCMs for incorporation into concrete or plastics.

SUMMARY OF THE INVENTION

One of the drawbacks of previous microencapsulated PCMs is their flammability. Some of the most typical PCMs are materials like paraffins which are highly flammable. This can greatly reduce the applications in which microencapsulated PCMs are useful. In accordance with the present invention, a flame retardant material or a PCM having inherent flame retardant characteristics is incorporated into the PCM to produce a material which is suitable for a wider variety of uses than more flammable microencapsulated PCMs would be useful.

One manifestation of the present invention is a microencapsulated PCM wherein the PCM is inherently flame resistant or the PCM additionally includes a flame retardant admixed therewith.

Another manifestation of the invention is a heat transfer fluid including a carrier fluid and microencapsulated PCMs wherein the PCM is inherently flame resistant or the PCM additionally includes a flame retardant admixed therewith.

Another manifestation is a flame resistant fiber or yarn which incorporates a microencapsulated PCM wherein the PCM is inherently flame resistant or the PCM additionally includes a flame retardant admixed therewith.

These and other manifestations of the present invention will be apparent from the following description.

DETAILED DESCRIPTION OF THE INVENTION

Any of a variety of processes known in the art may be used to microencapsulate PCMs in accordance with the present invention. One of the most typical methods which may be used to microencapsulate a PCM is to disperse droplets of the molten PCM in an aqueous solution and to form walls around the droplets using techniques such as coacervation, interfacial polymerization and in situ polymerization all of which are well known in the art. For example, the methods are well known in the art to form gelatin capsules by coacervation, polyurethane or polyurea capsules by interfacial polymerization, and urea-formaldehyde, urea-resorcinol-formaldehyde, and melamine formaldehyde capsules by in situ polymerization. A particularly preferred wall material for encapsulating PCMs is melamine-formaldehyde.

PCMs useful in the invention include paraffinic hydrocarbons having 13 to 28 carbon atoms. Additionally, crystalline materials such as 2,2-dimethyl-1,3-propanediol, 2-hydroxymethyl-2-methyl-1,3-propanediol, acids of straight or branched chain hydrocarbons such as eicosanic acid and esters such as methyl palmitate, and fatty alcohols may be used as PCMs in the present invention. In fact, substantially any hydrophobic PCM which can be dispersed in water and microencapsulated by the technology referenced above may be useful in the present invention.

Examples of useful inherently flame retardant phase change materials include halogenated paraffins having 10 to 22 carbon atoms and, more specifically, mono or poly-chlorinated and brominated paraffins such as bromooctadecane, bromopentadecane, bromononodecane, bromoeicosane, bromodocosane, etc.

Examples of flame retardants which may be used in admixture with PCMs include decabromodiphenyl oxide, octabromodiphenyl oxide, antimony oxide, etc. In general, the flame retardants will be used in an amount of about 3 to 20 parts per 100 parts PCM.

The size of the microcapsules typically range from about 1 to 100 microns and more typically from about 2 to 50 microns. The capsule size selected will depend on the application in which the microencapsulated PCM is used. For use in fibers, yarns or textiles, the capsule size is preferably about 1 to 15 and preferably 2 to 10 microns. For use in heat transfer fluids, the capsule size may range from about 1 to 100 microns and preferably 2 to 40 microns.

The microencapsulated PCM's of the present invention can be used in a variety of applications. For example, they may be used as the thermal transfer medium in a heat transfer fluid for use in lasers, supercomputers and other applications requiring high thermal transfer efficiencies. They also may be coated on fibers or incorporated into fibers to prepare insulative fabrics. They may be added to plastics or resins such as polypropylene and acrylics and spun into fibers or extruded into filaments, beads or pellets useful in thermal transfer applications such as insulative apparel such as clothes, shoes, boots, etc., building insulation for use in walls, floors, etc. The microcapsules are generally obtained as a slurry in water. They may be used as a slurry or the slurry may be dried and the microcapsule used as a dry powder. The microcapsules may also be incorporated into a binder to provide coatings useful in many of the applications in which unencapsulated PC's are not satisfactory.

The addition of the flame retardant additive to the PCM may enhance the PCM's thermal efficiencies and to narrow the temperature range over which the phase change occurs. The additive appears to function as a nucleating agent and cause the PCM to change phase at a faster rate and over a narrower temperature range. Consequently, the addition of the flame retardant additive is useful in tailoring the thermal transfer characteristics of the PCM and can be particularly advantageous where a narrow transition temperature range is desired.

In addition to being useful for their phase change properties, the encapsulated PCM's of the present invention are also useful for their flame retardant properties. For example, the incorporation of an inherently flame retardant encapsulated PCM or an encapsulated PCM containing a flame retardant into otherwise flammable substrates, such as polypropylene, imparts a flame retardant characteristic to the substrate in addition to the phase change characteristic.

The amount of microencapsulated PCM used will vary with the particular application. For use in heat transfer fluids, the amount will vary with the thermal transfer requirements. Typically, up to 50 wt % microencapsulated PCM will be used. The carrier fluid may be water, glycols, oils, or virtually any heat transfer fluid that does not affect the integrity of the microcapsule.

In fibers, the amount of microencapsulated PCM will also vary with the thermal transfer demand. The amount will typically range from about 5 to 35% by weight and more preferably 15 to 25% by weight. Useful fibers may be natural or synthetic and include wool, cotton, acrylic, rayon, nylon, polyester, polyamide, polyolefin and polytetra fluoroethylene (PTFE) fibers.

Having described the invention in detail and by reference to preferred embodiments thereof, it will be apparent that modifications and variations are possible without departing from the scope of the invention defined in the appended claims.

What is claimed is:

1. A microencapsulated flame resistant or flame retardant phase change material consisting essentially of a microcapsule wall former encapsulating a phase change material as an internal phase, said phase change material being a halogenated paraffin having 10 to 22 carbon atoms, wherein said halogenated paraffin is selected from the group consisting of a mono-chlorinated paraffin, a poly-chlorinated paraffin, a mono-brominated paraffin and a poly-brominated paraffin.

2. A fiber or filament containing a microencapsulated flame resistant or flame retardant phase change material, said phase change material consisting essentially of a microcapsule wall former encapsulating said phase change material as an internal phase, said phase change material being a halogenated paraffin having 10–22 carbon atoms, wherein said halogenated paraffin is selected from the group consisting of a mono-chlorinated paraffin, a poly-chlorinated paraffin, a mono-brominated paraffin and a poly-brominated paraffin.

3. The fiber or filament of claim 2 wherein said fiber or filament is selected from the group consisting of wool, cotton, acrylic, rayon, nylon, polyester, polyamide, polyolefin and polytetrafluoroethylene.

* * * * *

UNITED STATES PATENT AND TRADEMARK OFFICE
CERTIFICATE OF CORRECTION

PATENT NO.    : 5,435,376
DATED         : July 25, 1995
INVENTOR(S)   : Ronald L. Hart and Dale E. Work It is certified that error appears in the above-identified patent and that said Letters Patent is hereby corrected as shown below:

IN THE ABSTRACT:

Line 4, insert --flame-- before the word "resistant".

Signed and Sealed this

Seventeenth Day of October, 1995

Attest:

BRUCE LEHMAN

Attesting Officer

Commissioner of Patents and Trademarks